United States Patent [19]

Lanckton et al.

[11] Patent Number: 5,517,419
[45] Date of Patent: May 14, 1996

[54] ADVANCED TERRAIN MAPPING SYSTEM

[75] Inventors: Arnold H. Lanckton, Roma; Randall K. More, Manlius, both of N.Y.

[73] Assignee: Synectics Corporation, Fairfax, Va.

[21] Appl. No.: 94,882

[22] Filed: Jul. 22, 1993

[51] Int. Cl.[6] .......................... G06F 165/00; G01C 7/04
[52] U.S. Cl. .................. 364/449; 364/450; 348/148
[58] Field of Search ........................ 364/449, 450, 364/443, 456, 505; 348/143, 144, 148, 116, 118; 342/357, 457; 340/992, 995; 356/375, 376

[56] References Cited

U.S. PATENT DOCUMENTS

| | | | |
|---|---|---|---|
| 2,910,910 | 11/1959 | Rosenfeld et al. | 356/2 |
| 3,873,226 | 3/1975 | Teach | 404/84 |
| 4,140,193 | 2/1979 | Miller | 180/9.46 |
| 4,558,359 | 12/1985 | Kuperman et al. | 358/89 |
| 4,731,864 | 3/1989 | Modla | 382/54 |
| 4,837,700 | 6/1989 | Ando et al. | 364/449 |
| 4,839,656 | 6/1989 | O'Niell et al. | 342/357 |
| 4,868,771 | 9/1989 | Quick et al. | 364/573 |
| 4,875,034 | 10/1989 | Brokenshire | 340/721 |
| 4,890,233 | 12/1989 | Ando et al. | 364/457 |
| 4,949,268 | 8/1990 | Nishikawa et al. | 364/449 |
| 5,030,957 | 7/1991 | Evans | 342/357 |
| 5,087,919 | 2/1992 | Odagawa et al. | 342/357 |
| 5,111,209 | 5/1992 | Toriyama | 342/357 |
| 5,119,301 | 6/1992 | Shimizu et al. | 364/450 |
| 5,144,318 | 9/1992 | Kishi | 342/357 |
| 5,166,878 | 11/1992 | Poelstra | 364/424.01 |
| 5,210,540 | 5/1993 | Masumoto | 342/357 |
| 5,214,757 | 5/1993 | Mauney et al. | 395/161 |
| 5,247,356 | 9/1993 | Ciampa | 358/109 |
| 5,257,195 | 10/1993 | Hirata | 364/449 |
| 5,262,867 | 11/1993 | Kojima | 358/209 |
| 5,267,042 | 11/1993 | Tsuchiya et al. | 358/209 |
| 5,317,515 | 5/1994 | Matsuzaki | 364/454 |
| 5,394,333 | 2/1995 | Kao | 364/450 |
| 5,416,712 | 5/1995 | Geier et al. | 364/450 |

*Primary Examiner*—Michael Zanelli
*Attorney, Agent, or Firm*—Jon L. Roberts; Roberts & Associates

[57] ABSTRACT

A tractor and trailer together with a post-processing system that uses GPS satellites together with a dead reckoning system and associated cameras and sensors to determine the exact location of the system, translating this location information onto several photogrammetric mapping collectors for the purposes of developing an orthographic database image that can be correlated with other onboard sensors for determining the precise location of terrain features. The main sensor platform comprises a GPS receiver together with a plurality of visual sensors and a dead reckoning system mounted on a trailer. The GPS data and the dead reckoning data are brought together in a navigation system to provide precise location of the system. The camera system on board the trailer of the system comprises a series of cameras for recording images of the terrain as the trailer proceeds over the terrain of interest. During data collection, digital imagery is transmitted from each camera and received by an on-board computer. The collection of image data is triggered by the movement of the vehicle a certain distance along the ground. Simultaneously with the collection of the digital image data, the on-board GPS system and dead reckoning system are queried for geographical reference. A dataframe is then created and stored for each form of imagery from each camera. During post processing, an operator can extract highly accurate geographic coordinates from a combination of photogrammetric techniques using the stored images and geographic data. The system outputs hardcopy engineering plots and softcopy digital vector files.

16 Claims, 3 Drawing Sheets

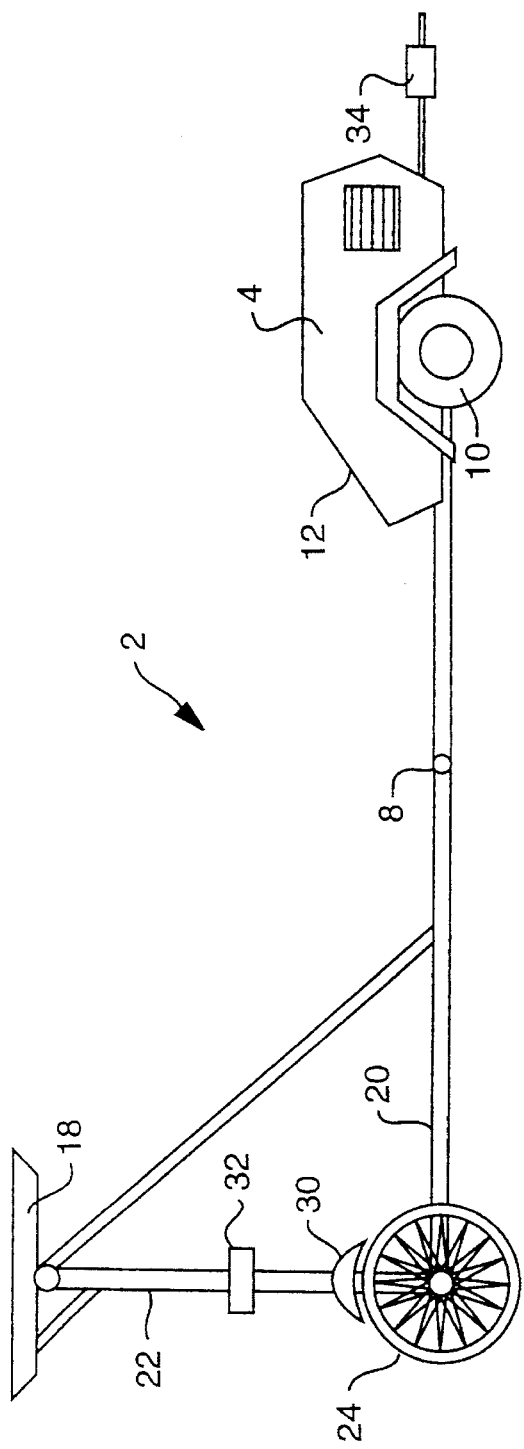
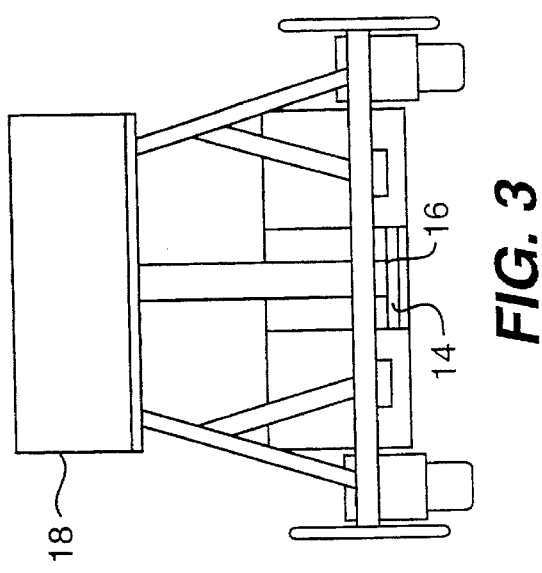
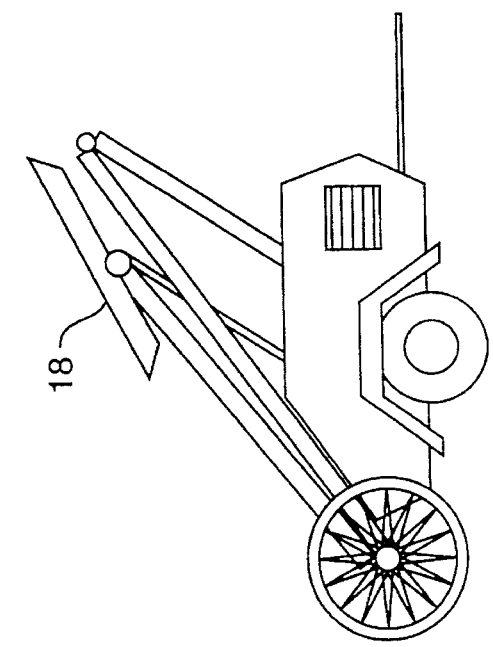

ADVANCED TERRAIN MAPPING SYSTEM

FIELD OF THE INVENTION

This invention relates generally to surveying and photogrammetric methods of providing terrain data and more specifically to a system for providing precise position data of terrain features quickly and for automatically imaging those features for engineering purposes and remote sensing.

BACKGROUND OF THE INVENTION

Mapping the terrain over a given route for construction repair, and other civil engineering projects have long been practiced both in the United States and abroad using conventional methods of surveying and installation of monuments. This a time consuming and very expensive task. Current estimates to perform these surveys is approximately $12,000 per mile. Those large areas of terrain without existing highways, the cost per mile of surveying nonexisting roads or monuments can be substantially higher. For example, new highways must be built in western Europe and in the former Soviet Union which may require very expensive surveying projects. Precise positional data is mandatory for highway surveys as it is critical to locate all terrain features (natural and manmade) which will affect the cost and schedule of highway repair and construction. Accuracy standards exist for such surveys which require X, Y and Z accuracy to within fractions of a foot.

In recent years the United States has established a series of satellites in the Global Positioning System (GPS) as a method of providing location of the surface of the earth in XYZ to a certain accuracy. The purpose of the GPS is to allow a person with the GPS receiver to determine his location anywhere that the receiver can receive signals from the GPS satellites. At the present time, the accuracy of position determination from the GPS standard civilian GPS receiver is approximately one meter. This accuracy is not sufficient for highway mapping which requires accuracies of 0.4 feet or 12 centimeters.

Various technologies have been used for determining precise position. Measurement from aerial photography with subsequent photogrammetric data reduction has long been in existence. With the implementation of the GPS several inventors have used this system for a variety of position determination purposes. For example, U.S. Pat. No. 5,087,919 to Odagawa et al. describes an on-board navigation apparatus which uses input from the global positioning system. U.S. Pat. No. 4,837,700 to Ando et al. describes a method and apparatus for processing data in a GPS receiving device in a road vehicle. This is an attempt to determine the vehicle position generally, by virtue of the GPS. Similarly, U.S. Pat. No. 5,111,209 to Toriyama describes a satellite based position determining system for determining the position of a mobile station using communication satellites.

An extension of the position determination using satellites, is represented by U.S. Pat. No. 5,144,318 to Kishi wherein a GPS receive station is located in a vehicle and whereby the vehicle can navigate a preplanned path by virtue of the information it receives from the GPS. U.S. Pat. No. 5,210,540 to Masumoto shows yet other enhancements for determining position of a vehicle by virtue of an on-board GPS receiver.

Other methods for determining a location of earth by virtue of satellites have also been described using an interaction with a stored mapping system. One such system is described in U.S. Pat. No. 5,214,757 to Mauney et al. and U.S. Pat. No. 4,839,656 to O'Neil et al.

In addition to the above, other surveying data and height measurements have been made using GPS. U.S. Pat. No. 5,030,957 to Evans describes a method of simultaneously measuring orthometric and geometric heights using the GPS satellite system.

All of these above references use the GPS but in a fashion not giving the required accuracy for various civil engineering projects when used on a moving vehicle. In addition, none of these GPS related programs document images that are taken simultaneously to further depict man-made and natural terrain features which are necessary in the civil engineering process.

In marked contrast to the above, the present invention uses a series of camera systems together with a GPS positioning system and a dead reckoning system to precisely calculate the location of the surveying vehicle at any point in time thereby correlating images taken with the geodetic position of the vehicle at the time images are taken.

SUMMARY OF THE INVENTION

It is therefore an object of the present invention to provide identification and documentation of terrain characteristics and features on the terrain for civil engineering purposes.

It is a further object of the present invention to provide a terrain mapping system using a global positioning system for accurate positioning of key terrain features.

It is another object of the present invention to allow geodite position date to be continuously recorded even though a GPS receiver is temporarily obscured or inoperable.

It is an additional object of the present invention to correlate image and position data for a given area of terrain in order to record and retrieve positioning information relative to key terrain features.

It is another object of the present invention to rapidly document positional information on a continuous basis without having to stop to place and record monuments.

It is still a further object of the present invention to accumulate a database of terrain information from a point of view that is moving with respect to the surrounding terrain.

It is yet an additional object of the present invention to provide a terrain mapping system that characterizes and documents terrain at a much lower cost than do existing systems.

These and other objects and advantages of the present invention will be apparent to those of ordinary skill in the art upon inspection of the detailed description, drawings, and appended claims.

The Advanced Terrain Mapping System ("ATMS") is a tractor and trailer together with a post-processing system that uses GPS satellites together with a dead reckoning system and associated cameras and sensors to determine the exact location of the ATMS, translating this location information onto photogrammetric mapping collectors for the purposes of developing an orthographic database image that can be correlated with other onboard sensors for determining the precise location of terrain features and performing automated feature identification and location of those features.

The first of the ATMS is contemplated for use in highway planning and construction. The main sensor platform comprises a GPS receiver together with a plurality of visual sensors and a dead reckoning system mounted on a trailer. The GPS provides ATMS location based on the satellite network. The dead reckoning system provides ATMS location and velocity vector data based upon wheel encoders, an attitude sensor, and a roll potentiometer. The GPS data and the dead reckoning data are brought together in a navigation system to provide continuous precise location of the ATMS.

The camera system on board the trailer of the ATMS comprises a series of cameras for recording images of the terrain as the trailer proceeds over the terrain of interest. A series of front, side, and rear mounted cameras give visual images correlated with the positional data which depict terrain features. The cameras are mounted such that all imaged terrain is imaged in stereo through sequential photographs from a single camera or simultaneous imaging of the terrain features by multiple cameras.

During data collection, digital imagery is transmitted from each camera and received by an on-board computer. The collection of image data is triggered by the movement of the vehicle a certain distance along the ground. Simultaneously with the collection of the digital image data, the on-board GPS system and dead reckoning system are queried for geographical reference. A dataframe is then created and stored for each form of imagery from each camera.

During post processing, an operator can extract highly accurate geographic coordinates from a combination of photogrammetric techniques using the stored images and geographic data. All of this information is stored in a geographic information system ("GIS").

The outputs of the ATMS are hardcopy engineering plots and softcopy digital vector files. The hardcopy engineering plots are typically used by civil engineers during highway planning. Because the information is stored in a GIS, a wide variety of types of hardcopy engineering plots can be generated. The softcopy data is made available in a variety of different formats, such as tape and CD ROM, for use in the GIS of another system.

BRIEF DESCRIPTION OF THE DRAWINGS

FIG. 1 shows the field system, extended to perform the survey function.

FIG. 2 shows the field system with the trailer stowed on the tractor for non-functional transport.

FIG. 3 shows and end view of the field system with the trailer stowed on the tractor for non-functional transport.

DETAILED DESCRIPTION

Figure 4:
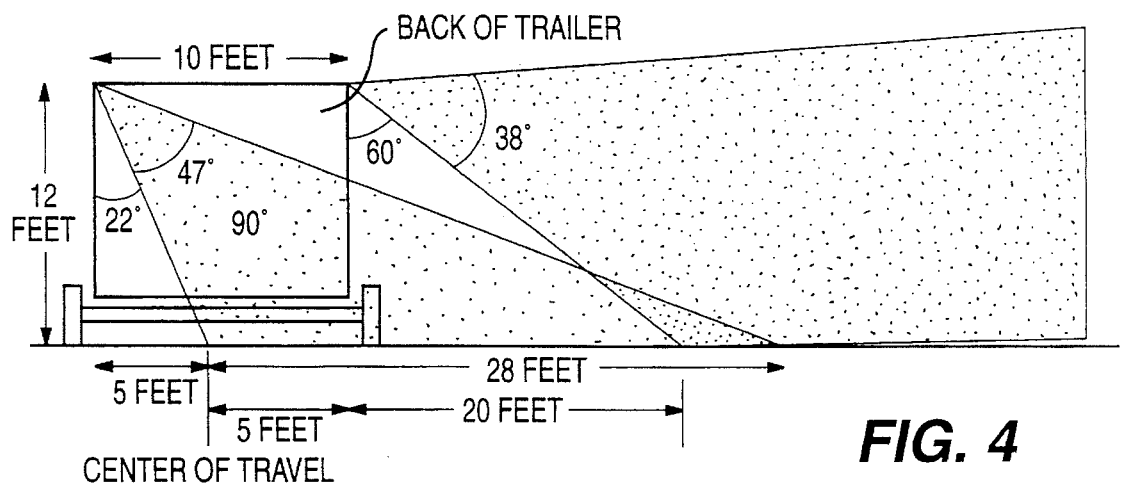
FIG. 4 shows the vertical coverage of the rear cameras.

The system of the present invention comprises two major subsystems: a field system and a post-processing system.

The field system is mounted on a towed vehicle and is designed to collect as much data as possible as the field system traverses the terrain being surveyed. The field system collects the data through the use of a GPS, a dead reckoning system, several digital cameras, on-board computers, and high density tape drives. The post-processing system accepts all of the data collected by the field system and processes this data to produce a variety of digital outputs.

Referring to FIG. 1, the field system 2 is described. The field system 2 is a field vehicle comprising a tractor 4 and a trailer 6. The tractor 4 houses a generator, processing equipment, and environmental control equipment. The trailer 6 provides a stable platform for navigation, camera, and data recording subsystems. As shown in FIG. 2, the trailer 6 portion of the field vehicle 2 may be stowed in piggyback fashion on the tractor 4 to make the field vehicle 2 street legal while in transit. When on the survey site, the trailer 6 can be extended and calibrated prior to commencing sensing operations. FIG. 1 shows the field vehicle 2 extended for survey.

Referring to FIG. 3, the tractor 4 is described. In the preferred embodiment, the tractor 4 has an eight feet wide by ten feet long by four feet high "U" shaped enclosure 12 which preferably attaches to the trailer 6 at a standard 1⅞ inches ball mount 8. The tractor 4 preferably uses 15 inch wheels 10 attached to a solid axle and isolated from the generator by King or equivalent mounts, and from the processing enclosure by pneumatic dash-pot mounts.

The tractor enclosure 12 is preferably made from aluminum equipped with racks to hold the electronic components, the rack mounts being vibrationally isolated and environmentally controlled. The tractor 4 also preferably includes an air conditioner for cooling the enclosed system. Environmental safety systems provide a warning and cause an emergency equipment shutdown at times of power or environmental extremes.

The enclosure 12 also contains a generator/compressor, preferably fueled by liquid propane gas. The generator/compressor provides power for the electronic equipment and air conditioner and provides the power to the tractor. The generator/compressor is vibrationally isolated and sound deadened, preferably to less than 100 dB at 20 feet. To further isolate the generator/compressor from the other tractor components, the generator/compressor may be located in an auxiliary enclosure separate from the main enclosure 12.

The erectable trailer unit 6 is attached directly to the centerline of the tractor's axle 14 through an oil-damped knuckle joint 16. This arrangement ensures that changes in tongue elevation on the tractor 4 have no effect on the trailer 6 and its associated sensor platform 18.

The connection to the tractor 4 is fitted with a roll sensor. This sensor determines the roll angle differential of the tractor 4 with respect to the trailer 6. This information, when combined with the precision wheel sensors on the trailer 6, provide the on-board computers with the ability to predict when the trailer 6 will experience "wheel dip" and compensate accordingly.

The trailer 6 is fabricated using welded tubular construction which is triangulated to provide a high degree of torsional stiffness and rigidity. All joints are high tolerance ball joints. The central spar 20 preferably contains a wiring conduit with a chaffing shield at all flex points for routing essential wiring back to the electronics in the tractor 4. The central spar 20 also preferably contains a 2.5" high velocity air duct, to provide a means for controlling environmental conditions at the sensor platform 18.

A sensor mast 22 extends upward from the far end of the central spar 20. At the top of the sensor mast 22 is the sensor platform 18 itself. The altitude of the sensor mast 22 is preferably three meters from ground level. The GPS receiver antenna is mounted on the upward face of the sensor platform 18. All of the optical and other sensors are preferably mounted below the sensor platform 18 so as to provide no obstructions for the GPS antenna, and to provide environmental shielding for the sensors. Power and environmental control resources are available, preferably at a junction box located at the top of the sensor mast.

The sensor platform 18 is preferably constructed of an aluminum/fiberglass composite. This gives it a light weight and high strength while still providing a ground plane for the GPS antenna. The underside of the platform preferably consists of a 6" lattice of 3" aluminum "C" channel, pre-drilled to accept a wide array of equipment mounting brackets. The "C" channel is side-drilled and covered with plastic chafe-guard to accept equipment cabling. At the center of the sensor platform 18 is a single 19" by 24" insulated rack complete with environmental controls. Eight inches of this rack are reserved for the GPS receiver and Attitude Sensor Analog to Digital Converters (ADCs).

The navigation system comprises the GPS receiver, a dead reckoning system and a navigation computer. Preferably, a twelve channel GPS receiver is used to determine its own absolute position with great precision. In addition, the dead reckoning system, comprising wheel encoders and an attitude sensor, will provide position information when GPS signals cannot be acquired as the field unit is moving. Both signals will be encoded into the data stream so that the post-processing system can have the entire position series from all sources available for position extrapolation. This approach allows for a more accurate position determination than could be achieved through instantaneous position determination alone.

The standard GPS receiver views the strongest signals from the currently visible constellation of GPS Satellites. Each of the visible satellites uses the same frequencies (1575.42 Mhz for the C/A-code and 1227.60 Mhz for the P-code). These signals are encoded using a pseudo-random algorithm, based on the satellite's identifier as the key and are then overlaid onto a 50 bit descriptor which describes the orbit, position, and current time-base reading for that satellite. Each of the satellites has a precise Cesium time-base on-board. In addition, the satellites periodically update their orbit information to a high degree of accuracy.

In a minimum GPS receiver configuration, a fix is generated by reading the relative positions from three satellites, and a time base from a fourth. This obviates the need for a time base on the receiver. The receiver scans the aggregate received signal by sequentially applying the key codes for all of the known satellites and looking for a match.

The lower precision process of correlating and tracking the satellites, coupled with ionosphere induced noise and distortion, means that standard civilian receivers can expect to get an accuracy of approximately 100 meters. It should be noted that the least significant portion of the 50 bit data packet is dithered (effectively encrypted) and is only available to military receivers. This means that military users can expect a 15 meter accuracy without taking additional steps.

Two GPS receivers may be run in concert with each other, and can be synchronized in the way in which they are viewing the satellite constellation. They will then both read the same position to a very high degree if in the same place. This is to say any error perceived by one will be perceived exactly the same by the other. This similarity in error perception remains constant to a high degree for receivers separated by as much as 150 kilometers.

This situation is exploited by the system of the present invention through the use of differential GPS fix generation. One GPS receiver is placed at a known location and a reading is taken. The difference between the GPS derived location value and the known absolute value is calculated and then transmitted (through any number of means) to a second GPS receiver whose position is to be determined. This correction vector is then applied to the reading of the second receiver and a corrected position is calculated.

This technique will increase the accuracy of civilian GPS measurements to below 1 meter, and to even better when the second unit remains stationary and an average is taken.

Advances in signal processing make it possible to use not only the range information, but the received signals' phase information as well. Also, receivers with as many as twelve simultaneous active channels are now available, from Magnavox for example. The addition of phase information to the position calculation in the present invention allows a differential based GPS position fix to be made to better than 1 cm for a stationary receiver, and better than 5 cm for a moving receiver.

The Dead Reckoning System ("DRS") includes wheel encoders, an attitude sensor, and a roll potentiometer. The DRS provides continuous position information which is used during times when GPS receivers are obscured by physical obstacles or weather.

The field vehicle rides on low-mass wheels 24 directly mounted to the trailer assembly 6. There is no suspension for the trailer assembly and tire pressure is high (50–70 lbs). This permits highly accurate position calculations for the navigation system. Low mass wheels ensure low slippage and scrub rates, and increase wheel encoder accuracies. Each wheel 24 is fitted with a 65 k count interpolated absolute position encoder, enabling the determination of the movement of the trailer and the calculation of the trailer's position and heading using reckoning.

The sensor platform mast 22 is fitted with a mass attitude sensor 32 used to determine the exact lateral inclination of the trailer on two axes. When combined with the position information gathered from the GPS and the wheel encoders 30, an extremely accurate position, altitude, attitude, heading vector can be constructed to keep a running position value.

The tractor to trailer connection includes a roll sensor 34. This sensor determines when the tractor "tips" due to road surface irregularities and then queues the navigation computer to momentarily reduce the gain on the attitude ADC's and to prepare for instantaneous acceleration due to the mast sway that will occur when the trailer 6 hits the same obstruction.

The navigation computer has the task of combining the information from the GPS and the reckoning sensors (wheel encoders, attitude sensor, and roll sensor) to determine the trailer's instantaneous position and velocity vector. This computer must compensate for GPS dropouts, wheel skip, acceleration and deceleration, and swaying induced by road surface, wind, and other sources. The navigation system is preferably a hardened 486-50 CPU fitted with ADCs and a time base corrector. It uses a time-rate-integration algorithm to compensate for acceleration and sway and dead reckoning to overcome GPS dropout. It then feeds a position/velocity vector field to all of the control computers to be used as their absolute reference.

The digital camera preferred for use with the system of the present invention is the Kodak Megaplus Camera Model 1.4, Class I Camera Package, C-Mount, with a Schneider Corporation of America Cinegon F1.8/10 mm lens, although other cameras may be used. This camera has the following properties:

Imaging Device: Solid State Charge-Coupled Device (CCD)

Pixels Array; 1317 horizontal lines and 1035 vertical lines

Pixel Size: 6.8 by 6.9 microns

Center to center pixel spacing: 6.8 microns

Maximum Frame Rate: 5.1 frames per second

Field of View: Horizontal 47.52°; Vertical 38.07°; and Diagonal 58.44°

The camera system of the present invention comprises a total of seven cameras: three cameras mounted on the front and four rear mounted cameras. One front mounted camera is forward looking and the other two face the sides of the field system 2. These cameras perform specific functions.

The front mounted forward viewing camera provides a display used for event cuing. This camera provides forward coverage through successive exposures.

The two side-directed cameras on the front, one to collect data on the left of the trailer and one to collect data on the right of the trailer, are synchronously exposed to provide simultaneous stereo coverage in conjunction with two of the rear mounted cameras. The base between the right stereo pair and the left stereo pair is preferably fixed at 1 meter, so as to provide accurate stereo measurements for deriving X, Y, and Z components from the center of the route of travel up to 28 feet to the left and right respectively.

The four rear mounted cameras are synchronously exposed to provide additional coverage. Referring to FIG. 4, the vertical coverage on the rear cameras is now described. All four cameras provide horizon-to-horizon coverage and are used to create a strip image along the route of travel.

The first rear camera is mounted on the left and collects imagery from the center of the route of travel to 28 feet to the right of the route of travel. The second rear camera is mounted on the right and collects imagery from 20 feet to the horizon on the right. These two cameras are oriented with the maximum field of view 47° perpendicular to the route of travel, so that maximum coverage is achieved.

The third rear camera is mounted on the right and collects imagery from the center of the route of travel to 28 feet on the left of the route of travel. The fourth rear camera is mounted on the left and collects imagery from 20 feet to the horizon on the left.

The second rear camera mounted on the right and the fourth rear camera mounted on the left collect stereo imagery by successive exposures and a measured base is used to derive X, Y, and Z components from 20 feet (8 feet of overlap is provided with the fixed base stereo camera to provide scale) from the center to the horizon or 107° above the vertical.

There are several photogrammetric modes of operation possible with these cameras. Conventional framing mode is the most common form of data collection, where the entire frame of imagery is exploited for its metric properties. Any one of the cameras can be used in the framing mode.

The digital camera are normally used as framing cameras. However, when a camera is mounted perpendicular to the route of travel on a terrestrial moving vehicle, each frame that is collected can be used in two different collection modes—vertical strip mode and horizontal strip mode.

With a digital camera it is not necessary to use the entire frame of data. In vertical strip mode the rear cameras are used to collect several lines of imagery that is perpendicular to the route of travel. The number of lines collected is dependent upon the rate of travel. In this mode, imagery is collected to create a strip image (or map) along the route of travel. When adjusted by digital terrain data, this image can be orthographically processed to create an orthophoto. The product has more information than a similar strip map and is more accurate because each pixel has an elevation associated with it (a map only has a contour line). In this mode the cameras are operated at their maximum framing speed and only the number of lines covering the distance traveled between exposures is collected.

In horizontal strip mode the left and right observing cameras are used. In this mode the horizontal plane defining properties of the digital cameras are used for feature identification and location.

Figure 5:
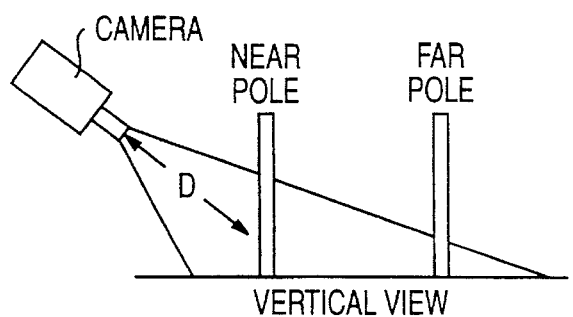
FIG. 5 shows a vertical view of a digital camera used in a horizontal strip mode.
Figure 6:
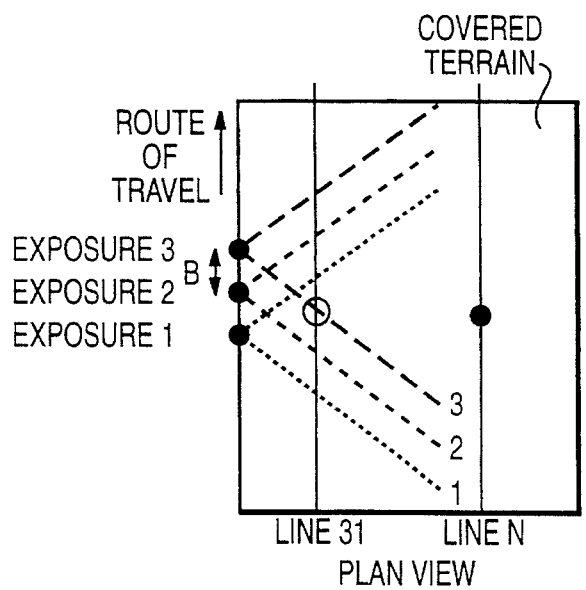
FIG. 6 shows a plan view of a digital camera used in a horizontal strip mode.

The horizontal strip camera is produced by orienting the camera perpendicular to the route of travel and recording the image as fast as possible. Then in lieu of recording each frame as a complete image, each successive horizontal line is recorded as a sequence. That is, an image is created by each horizontal line of pixels. If the camera has 1000 horizontal lines, 1000 horizontal strip images are created, processed, and analyzed. FIGS. 5 and 6 illustrate the vertical and plan views of such a digital camera operation. In these figures there are three successive exposures and there are two objects, a Near Pole and Line 31 and a Far Pole at Line N.

Figure 7:
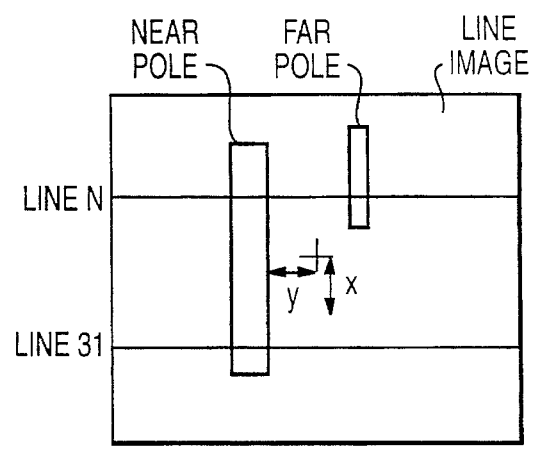
FIG. 7 shows a camera view of a horizontal strip mode.

FIGS. 7 and S illustrate the camera view of the two features and the three successive views of Lines 31 and N. In this figure the near pole moves across the Line 31 image in two lines, and in the Line N image the Far Pole is observed for three and probably more lines and the Near Pole is only observed for two lines.

Figure 8:
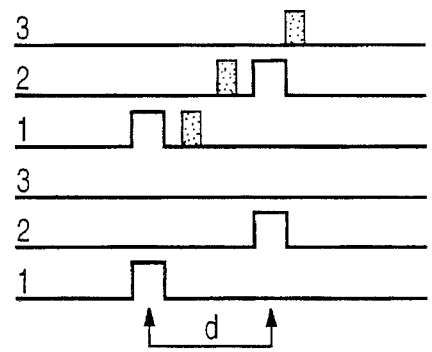
FIG. 8 shows the image processing result of a horizontal strip mode.

FIGS. 7 and 8 demonstrate that by the motion of objects across the line image (an image created by successive lines) it is possible to measure the distance D (in FIG. 5) through the following geometric relationships:

$$\frac{f}{D} = \frac{d}{B} \text{ or } D = \frac{Bf}{d}$$

Where f=Focal Length of the Camera, B=Distance traveled between exposures, d=Image motion between two successive exposures and D=Distance from the camera to the feature. Also, when the image crossed the center of each line, the location of the feature can be calculated from the angular location.

Also, the Angle A can be derived from the relationship of the location of each line (image measurement x) relative to the principal point of the camera by the expression: tan (A)=x/f. Assuming the X direction is parallel to the route of travel, the location of each feature as it crosses the center of each line can be located in space with the following relationship:

X=Location of the Vehicle

Y=Location of the Vehicle+Cos (A)D

X=Location of the Vehicle+Sine (A)D

Figure 9:
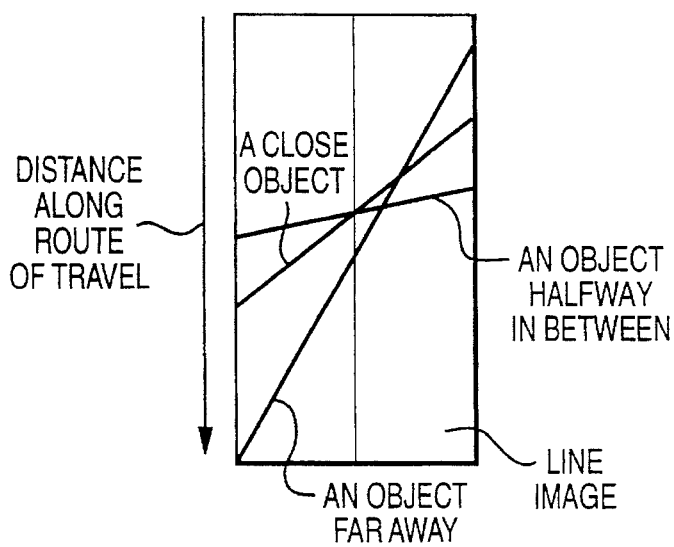
FIG. 9 shows a horizontal strip image.

FIG. 9 is an illustration of one line image from a digital frame camera operating in a horizontal strip mode, and as long as the vehicle is operating at constant speed and traveling in a straight direction, traces of features will travel diagonally across the image format and their angle of travel or their distance within the camera filed of view can be translated directly into the distance from the camera to the feature. Therefore, each feature can be measured (the diameters of poles, widths of signs, diameters of culverts, etc.).

Figure 10:
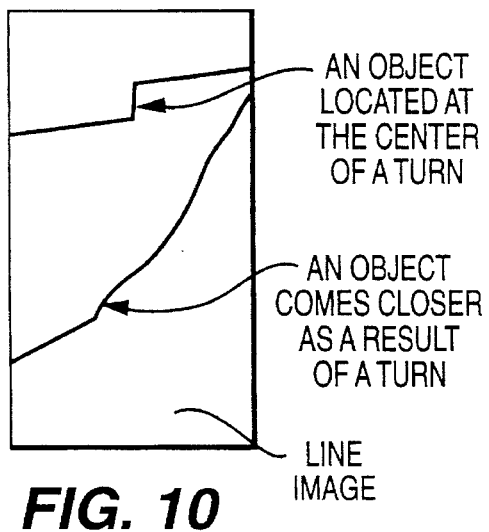
FIG. 10 illustrates changes in image tracks for a change in direction of travel.
Figure 11:
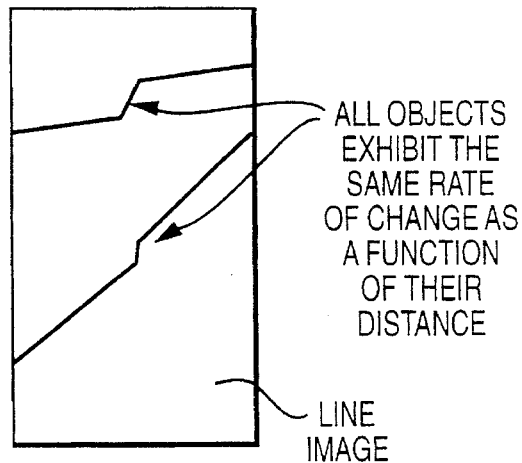
FIG. 11 illustrates changes in image tracks for a change in the rate of travel.

FIG. 9 is an illustration of an ideal situation; however, a vehicle seldom travels at a constant speed nor will cameras maintain their proper orientation (due to changes in the platform). If there is a change in camera orientation that change will be observed in the deviation of the image tracks. Also, if there is a change in vehicle speed, that change will also be observed in the image tracks. Thus, the image tracks can be used to determine changes in speed and orientation of the cameras during the creation of the strip image. FIGS. 10 and 11 illustrate the effects the changes in the platform will have on the image tracks.

FIGS. 10 and 11 illustrate the value of the Horizontal Strip mode of operation. The camera effectively creates a series of optical planes with each scan line. Successive exposures of each line record the motion of the camera between exposures so that not only can the scale at each feature be calculated, the motions of the camera platform can also be calculated. In FIG. 10, when a feature is located at the radius of turn, this information can be confirmed by comparison with the information being collected by the cameras collecting data from the opposite side of the vehicle. Thus, there are two confirming sources of information to accurately calculate the motion of the camera platform during the route of travel along the area being mapped.

The camera motion information can be used as a dead reckoning capability to accurately track the motion of the camera through the nine degrees of spatial freedom; X, Y, Z and the rotation about each one of these three dimensions. If the cameras begin from a known point and at a known orientation, the motion analysis derived from the horizontal strip camera can be used to determine the location of the cameras at each exposure point along the route of travel.

In addition to having the facility to locate objects within the field of view and to analyze the motion of the camera platform, the data collected can provide a significant amount of information about the feature type. As noted above, scale can be determined at each feature, so that the diameters of poles and sizes of objects can be accurately measured and automation can be provided for many features. The diameters of trees can be accurately determined automatically by measuring the width of the image (the left and right edges will be at the same distance and the distance between the edges can be automatically measured through standard image processing techniques). These measurements will occur for each scan line, thus an X, Y, Z file is developed for each feature. Now feature classification can be made based upon feature size and shape. This form of feature identification is much more accurate than any other image processing method, because shape and size is a far more accurate determinate of feature than any other measure. One of the problems in attempting to perform feature identification from conventional frame image is the orientation of the feature at the time of exposure. Features look different from different perspectives, thereby causing considerable problems in attempting to apply conventional image feature classification techniques.

With a digital camera operating simultaneously in vertical and horizontal strip modes, each pixel in the vertical strip mode can have an accurate determination of its spatial location, and information about the feature located at the location. From this information, an orthographic image can be created and the geometric data about the feature can be used for automatic identification. Assuming that these features have been man made (poles, culverts, guard rails, highway intersections, etc.) and have a geometric property, the identification can be easily accomplished. For natural features only feature classification (trees, bushes, etc.) can be performed.

In the conventional framing mode the digital cameras are used to collect conventional imagery. In this mode the imagery is commonly used for feature identification and for feature location through the application of conventional stereo photogrammetry. For feature location the standard solution of the intersection equations is used to locate the feature based upon the left and right measurements in the two stereo images.

The identification and location of features (including digital terrain elevations) can be accomplished with the Preprocessing System. With this system the two stereo images are viewed by an operator who selects points stereoscopically and the X,Y and Z values of these points are calculated. All of the side observing cameras are optimally suited for stereo photogrammetric measurements. The stereo coverage cameras on the left and right have a precisely measured base (distance between camera nodal points). This precise base allows measurement along the Y-axis to be made with a precision of ±0.1 centimeters.

Cuing information, recorded during data collection, will allow semi-automated location of important image features.

During data collection, digital imagery is transmitted from each camera over a high speed parallel interface, and is received by the on-board control computer. Each camera is capable of collecting 1.3 MB of 8 bit color imagery at a rate of up to 5.1 frames per second, or 6.6 MB of imagery per second. The actual rate at which data is captured will be determined by the speed of the vehicle. The collection of a frame of data will be triggered by the movement of the vehicle a fixed distance along the ground, thus eliminating the need for extremely high speed real-time data reduction prior to storage.

Simultaneous with the collection of a frame of imagery, the on-board GPS system and on-board dead reckoning system are both queried for geographic reference. If the system operator has generated a special interest marker, and the control computer has determined that the feature of interest will fall within the current camera frame, the special interest marker and feature serial number are also queried.

Following the collection of each frame of imagery, and the simultaneous collection of the geographic reference data and special interest data, a single data frame is composed for storage to high speed magnetic tape. The data frame consists of two parts: a fixed size frame header block, and a fixed size imagery data block of 1,363,095 bytes.

Figure 12:
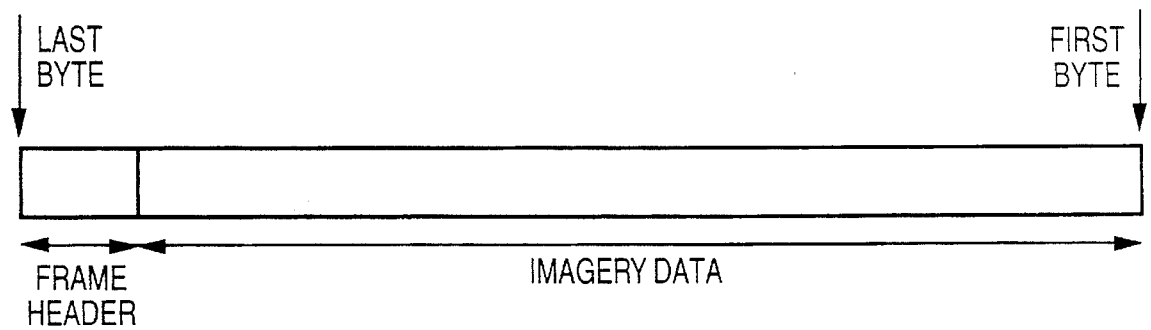
FIG. 12 shows the generic data frame format.

Referring to FIG. 12, the generic data frame format is described. The frame header block will contain the data necessary to perform exploitation of the imagery contained in the imagery data block, including latitude (and auxiliary data) from the GPS; longitude (and auxiliary data) from the GPS; elevation (and auxiliary data) from the GPS; latitude from dead reckoning; longitude from dead reckoning; elevation from dead reckoning; (x,y,z) attitude of the vehicle; sequential frame counter; special interest marker; feature serial number; number of rows of pixels in imagery data block; number of columns of pixels in imagery data block; camera geometry version; camera ID; and checksum for header data block.

One data frame will be composed for each camera. Once the data frame is composed, it will be written out to high speed, high capacity, magnetic tape. There is preferably one tape drive for each camera being used.

Collection of data in the field will result in the production of seven 8mm magnetic tapes, one from each imaging camera, containing imagery data, geographic reference data, and cuing data. These seven tapes must then be processed on the post-processing workstation to produce usable surveying information.

The post-processing workstation is a collection of hardware and software components suitable for the reduction of the raw engineering data, collected during a surveying run, into usable surveying information. The post-processing workstation will allow the operator to extract high accuracy geographic coordinates for features of interest within the collected imagery. Due to the volume of data collected by the advanced terrain mapping system, this workstation must be robust in both its storage capacity and processing power. The preferred hardware configuration of the workstation is as follows:

Sun SparcStation 10, Model 30, 32-MB RAM, 424-MB hard disk, 1.44-MB floppy disk, 8-bit color graphics, 10" color monitor 2 8 mm magnetic tape drives (5-GB)

CD-ROM player (669-MB)

10-GB Magneto-optical jukebox 1.3-GB hard disk

150-MB ¼" magnetic tape drive

Z-Screen stereographic viewing system

The software configuration for the post-processing workstation consists of a combination of Commercial-off-the-Shelf ("COTS") and custom software. The software configuration is as follows:

Solaris 2.0 Unix operating system

ICS X11R5 windowing system

ICS OSF Motif windowing toolkit

C++ software development environment

ARC Info GIS

Sybase RDBMS

Custom post-processing applications

During data collection, special interest markers are placed on the image tapes by the system operator. These special interest markers identify the specific frame(s) on a tape in which the feature of interest appears, as well as identifying the feature type by general category. Specific feature categories are added during the post-processing of the data. The special interest markers are stored in the "Special Interest Marker" field of the frame header block. Because of the collection geometry, a given feature will always appear either on two cameras simultaneously, or on successive frames on the same camera. This information can be used, as described below, to stereographically derive geographic coordinates for the feature identified by special interest markers.

The first step in the post-processing of the data is mensuration of precise geographic coordinates for each feature identified by a special interest marker. This process makes use of the image cuing concept described previously. Mensuration from the low side-looking cameras makes simultaneous use of the two low side-looking cameras on a given side on order to utilize the stereo coverage provided by these cameras. For the back-looking camera, and the high side-looking cameras, overlap between successive frames is used to provide stereo mensuration capability.

For the case of the low side-looking cameras, a given pair of cameras will always provide stereo coverage for each other. The first step in the post-processing of the data is to place the tapes from these two cameras into the two tape drives on the post-processing workstation. The stereo mensuration application on the workstation then scans the two tapes for the frame on each tape containing a special interest marker with the same serial number. These two image frames are then displayed on the workstation, with one of the images being placed on the monitor screen and the other being placed on the Z-Screen. This display allows an operator, wearing polarized lens glasses, to view the scene in three dimensions.

The stereo mensuration application then projects a dot onto each of the two images. Using the mouse, the operator places the dot on each image at the base of the object of interest. When the dots are properly aligned, a single dot appears to "float" on the surface of the ground. Once this affect is achieved, the locations of the dots on the two images can be used, in conjunction with standard photogrammetric equations and a mathematical model of the cameras, to derive a precise location of the feature in relation to the collection platform. This location is given in terms of an (x,y,z) distance, in feet or inches, from the camera. A geographic translation can then be performed against the geographic coordinates stored in the image frame header to derive a geographic location for the given feature of interest. This process is repeated for each pair of marked frames on the two tapes.

For the case of the high side-looking cameras, successive frames on the same camera are used to provide stereo coverage. For this case, a single tape is placed in the post-processing workstation. The stereoscopic mensuration application then scans the tape for two frames with special interest markers with the same serial number. These two frames are then placed on the monitor and the Z-Screen. Mensuration takes place in the same manner as in the case of the low side-looking camera.

In both cases, as a feature is measured/positioned, the operator enters additional information on the feature. Representative information might include specific feature categories, information on condition of the feature, notes regarding the feature, or relationship to other frames. This allows the construction of line and area features, as well as detailed attribution.

As features are completed, they are stored directly to the GIS. Upon completing the post-processing for all tapes of a given surveying run, a complete, populated, GIS database for that section of road will exist. This database can then be used to generate hardcopy engineering plots for delivery to the customer.

Following post-processing of the raw imagery data, two key products can be produced for delivery to a customer, namely hardcopy engineering plots and softcopy digital vector files.

The primary data product, produced for delivery to the customer, will be the hardcopy engineering plot. This is a vector map plot, produced by the GIS system, on a pen plotter. Hardcopy plots will range in size from A–E sizes, as required by the customer. Other plotters may make engineering plots available in larger and/or non-standard sizes.

Following post-processing, the GIS will contain the geographic locations of all features of interest. The hardcopy plot will present the features of interest in an annotated format, using standardized symbology. The flexibility of the GIS will allow the format of the plots to be customized to meet individual customer requirements.

The secondary data product, produced for delivery to the customer, will be softcopy digital vector files. These files constitute the softcopy files that are used for populating the customers' GIS database, and can take any of a number of forms.

Numerous commercial GIS packages exist on the market today. Each uses its own database format and data management system. Fortunately a number of standards have evolved for performing geographic data exchange between differing GIS packages. The system of the present invention will produce digital files in a number of commonly used standards, including ARC Info Import/Export (for supporting ARC Info GIS), IGDS (for supporting Intergraph GIS), and IGES (an international standard supported by a number of GIS packages).

These three exchange formats will support the vast majority of GIS packages currently on the market. Additional exchange formats may be added as required by users.

Digital data may be disseminated to the customer on a number of different media, including 8mm magnetic tape cartridge (2.3 GB and 5 GB), ¼" magnetic tape cartridge (150 MB), 3 ½" floppy disk (1.44 MB), and high speed modem.

Additional distribution media may be added as required by customer demand. Several options include WORM disk, removable hard disk, rewritable optical disk, 4 mm magnetic tape, and CD-ROM.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. A terrain mapping system, comprising:
   A) a field system;
   B) a global positioning system receiver mounted on the field system for receiving field system position information from a global positioning system satellite;
   C) a dead reckoning system, mounted on the field system and comprising a wheel encoder, an attitude sensor, and a roll potentiometer connected to determine and provide geographic reference data relative to the field system; and
   D) a navigation system comprising computer logic for correlating the position information from the global positioning receiver and the geographic reference data from the dead reckoning system to determine and record a data collection position of the field system;
   E) the global positioning receiver and the dead reckoning system operating concurrently to provide continuous field system position and velocity vector information.

2. The terrain mapping system of claim 1, further comprising:
   A) a plurality of cameras mounted on the field system for capturing digital images of terrain proximate to the field system and for providing an output of these digital images to be stored by the navigation system computer;
   B) the navigation system including logic for automatically marking the digital images with position and velocity vector information in order to correlate the position and velocity vector information with the digital image output.

3. The terrain mapping system of claim 2, wherein the plurality of cameras are mounted such that the images provide a stereo characterization of the terrain proximate to the field system and to permit presentation of terrain features to occur.

4. The terrain mapping system of claim 2, wherein the cameras are high resolution digital cameras having a frame rate of at least 5 frames second.

5. The terrain mapping system of claim 4, further comprising:
   A) sensor wheels on which the field system rolls while being transported; and
   B) wherein rotation of the sensor wheels providing position and velocity vector information through the use of the wheel encoder to supplement the global positioning receiver.

6. The terrain mapping system of claim 5, wherein the resolution of the wheel encoder is about 65,000 positions over the circumference of the sensor wheels.

7. The terrain mapping system of claim 2, further comprising a post-processing workstation for processing the digital images and position and velocity vector information to provide terrain surveying information, the post-processing workstation comprising:
   A) processing means having graphics capability;
   B) storage means in which the digital images and correlated position and velocity vector information are stored; and
   C) display means for viewing the digital images and position and velocity vector information, the display means including stereographic viewing means.

8. The terrain mapping system of claim 7, wherein the post-processing workstation performs photogrammetric data reduction of the digital images and the correlated position and velocity vector information.

9. The terrain mapping system of claim 8, wherein the post-processing workstation provides an output comprising hardcopy engineering plots of terrain surveyed by the terrain mapping system and softcopy vector files of the digital images and correlated position and velocity vector information collected by the terrain mapping system.

10. The terrain mapping system of claim 2, wherein the images captured by the plurality of cameras are associated with an identification number by a system operator for future retrieval of key terrain features and correlated position and velocity vector information.

11. A method for mapping terrain, comprising:
   A) collecting global positioning information from a plurality of global positioning satellites at a particular location on the terrain;
   B) collecting dead reckoning information at the same location on the terrain;
   C) combining the global positioning information and the dead reckoning information to determine and record data collection position data of the particular location on the terrain;
   D) capturing digital images of terrain proximate to the particular location;
   E) capturing overlapping digital images of terrain proximate to the particular location to provide a stereo characterization of the terrain proximate to the particular location through a mensuration process;
   F) correlating the digital images with the instantaneous position data;
   G) collecting global positioning information at a new particular location on the terrain;
   H) collecting dead reckoning information at the same new location on the terrain;
   I) continuously combining the global positioning information and the dead reckoning information to determine instantaneous position data of the particular location on the terrain as the particular location on the terrain changes to a new location on the terrain;
   J) processing the digital images and the instantaneous position data to provide terrain surveying information;

K) associating an identification number with each digital image to facilitate future retrieval of the digital images based on key terrain features on the digital images; and L) performing photogrammetric data reduction of a horizontal strip camera to determine the spatial location of each pixel for automated derivation of terrain elevation and feature recognition.

12. The method of claim 11, comprising correcting for errors in future determinations of position at the particular location of the terrain by using known global positioning data at a fixed point to calculate a standard error value to be applied to all future determinations of instantaneous position.

13. The method of claim 11, further comprising using the collected dead reckoning information to interpolate global positioning information when a line of sight of any of the plurality of satellites is obscured by physical structures.

14. The method of claim 11, further comprising performing photogrammetric data reduction of the digital images and the correlated instantaneous position data.

15. The method of claim 14, further comprising providing a hardcopy engineering plot of the terrain surveyed.

16. The method of claim 15, further comprising providing a softcopy vector file of the terrain surveyed.

* * * * *